Figures 1, 2, 3:
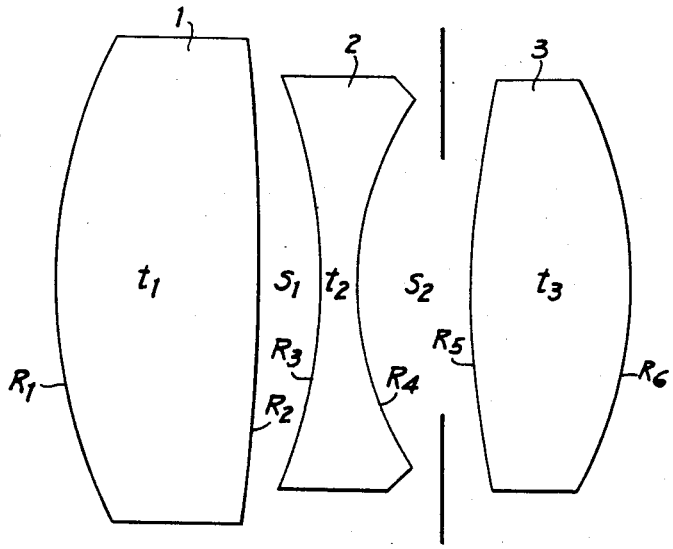

April 11, 1950     W. LITTEN ET AL     2,503,751

PHOTOGRAPHIC OBJECTIVES OF THE COOKE TRIPLET TYPE

Filed Sept. 28, 1948

| EF = 100 mm. | | | | f/1.9 |
|---|---|---|---|---|
| LENS | N | V | RADII | THICKNESSES |
| 1 | 1.745 | 43.8 | $R_1$ = +62.63mm. | $t_1$ = 25.56 mm. |
| | | | $R_2$ = -348.5 | $S_1$ = 7.89 |
| 2 | 1.647 | 29.6 | $R_3$ = -66.47 | $t_2$ = 4.51 |
| | | | $R_4$ = +39.62 | $S_2$ = 14.14 |
| 3 | 1.697 | 56.2 | $R_5$ = +119.5 | $t_3$ = 19.92 |
| | | | $R_6$ = -52.41 | |

| EF = 100mm. | | | | f/2.5 |
|---|---|---|---|---|
| LENS | N | V | RADII | THICKNESSES |
| 1 | 1.734 | 51.1 | $R_1$ = +43.01 mm. | $t_1$ = 13.65 mm. |
| | | | $R_2$ = -431.4 | $S_1$ = 6.76 |
| 2 | 1.689 | 30.9 | $R_3$ = -82.99 | $t_2$ = 9.24 |
| | | | $R_4$ = +35.26 | $S_2$ = 17.66 |
| 3 | 1.734 | 51.1 | $R_5$ = +133.5 | $t_3$ = 5.30 |
| | | | $R_6$ = -71.19 | |

WALTER LITTEN
GEORGE H. AKLIN
FRED E. ALTMAN
*INVENTORS*

BY Harold F. Bennett

ATTORNEY & AGENT

Patented Apr. 11, 1950

2,503,751

UNITED STATES PATENT OFFICE 2,503,751

PHOTOGRAPHIC OBJECTIVE OF THE COOKE TRIPLET TYPE

Walter Litten, George H. Aklin, and Fred E. Altman, Rochester, N. Y., assignors to Eastman Kodak Company, Rochester, N. Y., a corporation of New Jersey Application September 28, 1948, Serial No. 51,614

7 Claims. (Cl. 88—57)

This invention relates to photographic objectives of the type consisting of three simple airspaced elements, namely a biconcave element between two positive elements, in which each positive element has its outer surface the more strongly curved. This type of lens is widely used and known as the Cooke triplet.

An object of the invention is to provide an improved triplet covering a moderate field and having a large aperture and very small zonal spherical aberration.

An ancillary object of the invention is to provide a triplet which takes full advantage of the potentialities of the high-dispersion fluorosilicate glasses described in copending applications Serial No. 644,182 Sun, now Patent No. 2,481,701, issued September 13, 1949, and Serial No. 722,276 Osborn and De Paolis, filed January 15, 1947.

The triplet is a highly developed type of objective and the general theory relating thereto is well known. The Petzval sum is corrected by reason of the fact that the negative element is stronger than would be the case if the three lenses were in contact (the same equivalent focal length being maintained), and thus this element makes a larger negative Petzval contribution. The strong negative element introduces rather large zonal spherical aberration, which limits the maximum useful aperture. This is more serious in objectives with short overall length than in longer objectives. Conversely, the longer objectives tend to vignette at the edges of the field and to have an inward curving image. Consequently, the best lenses of this type roughly follow the rule that the shorter ones cover a wider field and have a smaller aperture and the longer ones cover a smaller field and work at a larger aperture. Any change which increases either the field or the aperture without decreasing the other and without increasing the residual aberrations constitutes an improvement over previous lenses.

According to the present invention, a Cooke triplet having a reduced zonal spherical aberration is constructed in which the refractive index of the negative element is less than the average refractive index of the two positive elements, the power of the negative element (computed as the sum of the surface powers) is between $-2.5/F$ and $-2.86/F$ where $F$ is the focal length of the objective, the thickness of the front positive element is greater than that of the rear element, and the front airspace is between 0.3 and 0.7 times the rear airspace. The color is corrected by the V-value of the negative element being between 0.5 and 0.62 times the average of the V-values of the two positive elements. Preferably the refractive index of the negative element is less than the average of the positive elements by more than 0.035.

These features in combination lead to superior correction of the spherical aberration, and are most valuable in objectives having an overall length between $0.4F$ and $0.8F$ and covering a moderate field of 15° or less from the axis. It is advantageous to have the average of the powers of the two positive elements between $1.5/F$ and $1.8/F$ and to have the shape of the negative element such that the radius of curvature of its rear surface is between 0.3 and 1.0 times that of its front surface. The thickness of the negative element is advantageously between about $0.04F$ and $0.12F$, and the thicknesses of the positive elements should be between $0.05F$ and $0.28F$. The thicknesses of the elements have a surprising and hitherto unsuspected effect on the zonal aberration. Where the marginal aberration rays converge toward the axis within a positive element, thickening improves the zonal aberration, but where these marginal rays diverge within a positive element, then the element should be made as thin as manufacturing economy permits. These rays always converge more strongly in the front component than in the rear, hence the front component is made thicker than the rear component. In a highly preferred form of the invention, an objective with an aperture of F/1.9 is made up in which the thickness of the front positive element is greater than 0.20 and the over-all length is greater than $0.65F$. In actual tests, an objective of this type compares favorably with four-element objectives previously made.

In another preferred form of the invention, the thickness of the front element is more than twice the thickness of the rear element, and the rear airspace is more than twice the front airspace.

In both these preferred forms of the invention, the sum of the front airspace plus the thickness of the front element is between 0.8 and 1.1 times the sum of the rear space plus the thickness of the rear element, and the thickness of the front element is more than 1.2 times that of the rear element. We have found that these relationships contribute materially to the high degree of correction which has been attained in these preferred forms of the invention.

In regard to the distribution of powers between the two positive components, this, as is well known, is dictated by the requirement for correction of distortion and is greatly influenced by the comparative size of the two airspaces. A trial lens which shows barrel-shaped distortion (in taking) needs more power in the front element and less in the rear or needs the front space increased relative to the rear space. If it shows pin cushion distortion, changes are to be made in the opposite sense. Thus if an objective is described as "corrected for distortion" the ratio of powers of the two positive elements is defined with a high degree of definiteness to those skilled in the art. In practice, objectives according to the invention usually have the power of the front component between 0.6 and 1.4 times that of the rear component.

All the above-mentioned limitations except those in the last paragraph are summed up in the following algebraic inequalities, to which suitable upper or lower limits have been added where necessary for the sake of definiteness:

$$1.58 < N_2 < (N_1+N_3)/2 < 1.82$$
$$25. < V_2 < 0.31(V_1+V_3) < 40.$$
$$2.5/F < -P_2 < 2.86/F$$
$$1.6/F < (P_1+P_3)/2 < 1.8/F$$
$$R_1 < \pm R_2$$
$$-0.3R_3 < R_4 < -R_3$$
$$R_6 < \pm R_5$$
$$0.05F < t_3 < t_1 < 0.28F$$
$$0.039F < t_2 < 0.12F$$
$$0.045F < \tfrac{1}{3}s_2 < s_1 < 0.7s_2 < 0.17F$$
$$0.4F < O.L. < 0.8F$$

and preferably $$(N_2+0.035) < (N_1+N_3)/2$$
$$1.2t_3 < t_1$$
$$0.8(s_2+t_3) < (t_1+s_1) < 1.1(s_2+t_3)$$

In one preferred species:

$$.20F < t_1$$
$$.65F < O.L.$$

and in another preferred species:

$$2t_3 < t_1$$
$$2s_1 < s_2$$

In this table and in the claims N and V are the refractive index for the D spectral line and the reciprocal dispersive index respectively of a lens element, P is the power of a lens element computed as the sum of the surface powers, R is the radius of curvature of a lens surface, $t$ is the thickness of a lens element, $s$ is the space between two lens elements, each category being numbered by subscripts from front to rear, and O. L. is the overall length of the lens, that is the sum of the three thicknesses and the two airspaces. As previously defined, F is the focal length of the objective. The + and − signs on the R's indicate surfaces respectively convex and concave to the front.

In the accompanying drawing:

Fig. 1 shows in diagrammatic section an objective according to a highly preferred form of the invention.

Fig. 2 gives data for the objective of Fig. 1.

Fig. 3 gives data for another preferred form of the invention similar to Fig. 1.

The data of Figs. 2 and 3 is repeated below for convenience, and further examples are given. The focal length in each case is 100 mm. The symbols are as defined above.

Example 1, F/1.9 — Field ±12°

| Lens | N | V | Radii | Thicknesses |
|---|---|---|---|---|
| 1 | 1.745 | 43.8 | $R_1$=+62.63 mm. $R_2$=−348.5 | $t_1$=25.56 mm. $s_1$= 7.89 |
| 2 | 1.647 | 29.6 | $R_3$=−66.47 $R_4$=+39.62 | $t_2$= 4.51 $s_2$=14.14 |
| 3 | 1.697 | 56.2 | $R_5$=+119.5 $R_6$=−52.41 | $t_3$=19.92 |

Example 1 is intended to be made up in a 1-inch or ½-inch focal length for use on 16 mm. or 8 mm. motion picture cameras.

Example 2, F/2.5 — Field ±14°

| Lens | N | V | Radii | Thicknesses |
|---|---|---|---|---|
| 1 | 1.734 | 51.1 | $R_1$=+43.01 mm. $R_2$=−431.4 | $t_1$=13.65 mm. $s_1$= 6.76 |
| 2 | 1.689 | 30.9 | $R_3$=−82.99 $R_4$=+35.26 | $t_2$= 9.24 $s_2$=17.66 |
| 3 | 1.734 | 51.1 | $R_5$=+133.5 $R_6$=−71.19 | $t_3$= 5.30 |

In example 2, $t_1$ is more than twice $t_3$, thus one of the features of the invention is carried to a high degree. This was found to be very helpful in reducing the zonal aberration.

Example 3, F/2.8 — Field ±15°

| Lens | N | V | Radii | Thicknesses |
|---|---|---|---|---|
| 1 | 1.745 | 46.4 | $R_1$=+51.43 mm. $R_2$=−409.5 | $t_1$=12.46 mm. $s_1$=10.77 |
| 2 | 1.647 | 29.6 | $R_3$=−56.35 $R_4$=+37.99 | $t_2$= 3.99 $s_2$=16.96 |
| 3 | 1.697 | 56.1 | $R_5$=+232.6 $R_6$=−46.18 | $t_3$= 8.53 |

Both the following example and the preceding one were designed to be made up in a 3- or 4-inch focal length, and the two are very similar.

Example 4, F/2.8 — Field ±15°

| Lens | N | V | Radii | Thicknesses |
|---|---|---|---|---|
| 1 | 1.755 | 47.2 | $R_1$=+52.40 mm. $R_2$=−459.5 | $t_1$=12.94 mm. $s_1$=10.82 |
| 2 | 1.647 | 29.6 | $R_3$=−55.57 $R_4$=+39.00 | $t_2$= 4.00 $s_2$=17.64 |
| 3 | 1.697 | 56.1 | $R_5$=+243.4 $R_6$=−45.67 | $t_3$= 5.29 |

The following example was designed for use as a motion picture projection lens. The glass used in the positive elements is less expensive than the higher index glasses used in the other examples.

Example 5, F/2.8 — Field ±12°

| Lens | N | V | Radii | Thicknesses |
|---|---|---|---|---|
| 1 | 1.617 | 55.0 | $R_1$= +38.09 mm. $R_2$=−352.4 | $t_1$= 7.24 mm. $s_1$= 9.17 |
| 2 | 1.616 | 32.0 | $R_3$=−61.33 $R_4$=+33.79 | $t_2$= 4.40 $s_2$=16.06 |
| 3 | 1.617 | 55.0 | $R_5$=+133.5 $R_6$=−50.51 | $t_3$= 6.59 |

The last two examples, below, were designed to be made up in a 1½-inch focal length and to cover a smaller field, about ±5°.

Example 6, F/2.8      Field ±5°

| Lens | N | V | Radii | Thicknesses |
|---|---|---|---|---|
| 1 | 1.697 | 56.1 | $R_1 = +51.78$ mm. | $t_1 = 8.39$ mm. |
|   |       |      | $R_2 = -149.2$ | $s_1 = 8.71$ |
| 2 | 1.649 | 33.8 | $R_3 = -47.01$ | $t_2 = 4.41$ |
|   |       |      | $R_4 = +44.91$ | $s_2 = 16.05$ |
| 3 | 1.697 | 56.1 | $R_5 = \infty$ | $t_3 = 7.87$ |
|   |       |      | $R_6 = -42.18$ |    |

Example 7, F/2.8      Field ±5°

| Lens | N | V | Radii | Thicknesses |
|---|---|---|---|---|
| 1 | 1.697 | 56.1 | $R_1 = +46.32$ mm. | $t_1 = 8.32$ mm. |
|   |       |      | $R_2 = -248.2$ | $s_1 = 11.76$ |
| 2 | 1.615 | 31.9 | $R_3 = -55.27$ | $t_2 = 4.37$ |
|   |       |      | $R_4 = +55.37$ | $s_2 = 22.16$ |
| 3 | 1.697 | 56.1 | $R_5 = +222.9$ | $t_3 = 7.90$ |
|   |       |      | $R_6 = -51.73$ |    |

The last three examples illustrate the advantage of increasing the difference between $(N_1+N_3)/2$ and $N_2$. This difference is preferably greater than 0.035. The spherical aberration of the F/4.0 marginal ray and the F/2.8 zonal ray has been computed for the D spectral line in Examples 5 and 7 and for the G′ line in Examples 6 and 7. These aberrations are as follows:

| Example Number | Wave Length | Index Difference | Spherical Aberration | | Net Zonal |
|---|---|---|---|---|---|
|   |   |   | f/2.8 | f/4.0 |   |
| 5 | D  | .001 | +.0090 | −.0033 | .0077 |
| 6 | G′ | .038 | +.0050 | −.0055 | .0080 |
| 7 | D  | .082 | +.0016 | −.0031 | .0039 |
| 7 | G′ | .071 | +.0031 | −.0026 | .0041 |

The "net zonal aberration" given in the last column is computed by the standard algebraic formula:

$$\left(\frac{2.8}{4.0}\right)^2 (F/2.8 \text{ aberration}) - (F/4.0 \text{ aberration})$$

and is as readily seen, it improves (i. e. decreases) greatly with an increase in index difference, the power of the negative element being nearly the same in all three examples.

All seven examples embody all the broad features of the invention. This is brought out in detail in the following table:

| Example No. | 1 | 2 | 3 | 4 | 5 | 6 | 7 |
|---|---|---|---|---|---|---|---|
| $(N_1+N_3)/2-N_2$ | .074 | .045 | .074 | .079 | .001 | .048 | .082 |
| $V_2$ | .296 | .302 | .289 | .286 | .291 | .304 | .284 |
| $V_1+V_3$ |  |  |  |  |  |  |  |
| $+P_1 F$ | 1.40 | 1.88 | 1.63 | 1.61 | 1.80 | 1.81 | 1.79 |
| $-P_2 F$ | 2.61 | 2.79 | 2.85 | 2.82 | 2.83 | 2.83 | 2.85 |
| $+P_3 F$ | 1.91 | 1.58 | 1.80 | 1.81 | 1.68 | 1.65 | 1.66 |
| $(P_1+P_3)F/2$ | 1.66 | 1.73 | 1.72 | 1.71 | 1.74 | 1.73 | 1.72 |
| $R_1/\pm R_2$ | .18 | .10 | .13 | .11 | .11 | .35 | .19 |
| $R_4/-R_3$ | .60 | .43 | .67 | .70 | .55 | .96 | .64 |
| $R_4/\pm R_5$ | .43 | .53 | .20 | .19 | .38 | .00 | .23 |
| $t_1/t_3$ | 1.28 | 2.58 | 1.46 | 2.45 | 1.10 | 1.06 | 1.07 |
| $t_2/F$ | .045 | .092 | .040 | .040 | .044 | .044 | .044 |
| $s_1/s_2$ | .56 | .38 | .62 | .61 | .57 | .54 | .53 |
| O.L./F | .720 | .526 | .527 | .507 | .435 | .454 | .544 |

It will be noted further that $-R_1/R_2$ is between 0.05 and 0.50 and that $-R_6/R_5$ is between 0.00 and 0.70 in every case. These shapes of the positive components were found to be advantageous in correcting the coma and curvature of field.

Example 1 is the first-mentioned preferred species in which $t_1 > 0.20F$ and the over-all length is greater than $0.65F$. Example 2 is the second-mentioned preferred species in which $t_1 > 2t_3$ and $s_2 > 2s_1$. The features common to both these species, namely that $(t_1+s_1)$ is between 0.8 and 1.1 times $(t_3+s_2)$ and that $t_1 > 1.2t_3$ are also common to Examples 3 and 4. The preferred feature that $(N_1+N_3)/2 - N_2$ is greater than 0.035 is found in all the examples except Example 5, which for the sake of economy is made of less expensive glass.

In Examples 1, 3, 4, 5, and 7, the biconcave elements are made of high dispersion fluosilicate glass of the type already mentioned. These glasses have refractive indices between 1.58 and 1.70 and dispersive indices between $$\frac{1.9275-N}{0.0105} \text{ and } \frac{2.1200-N}{0.014}$$

The use of these glasses is in itself a great advantage in carrying out the invention. The glasses used in the biconcave elements of Examples 2 and 6 and in the positive elements of Example 5 are listed in glass catalogs of various manufacturers. The other glasses mentioned are borate crowns and are in current production at the Eastman Kodak Company.

We claim:
1. A photographic objective corrected for spherical aberration, coma, curvature of field, distortion, and chromatic aberration and consisting of a biconcave element airspaced between two positive elements which have their more strongly curved surfaces turned away from the negative element, in which the refractive indices N for the D line of the spectrum, the reciprocal dispersive indices V, the powers P of the individual elements each computed as the algebraic sum of the surface powers, the radii R, the axial thicknesses $t$ of the elements and the axial separations $s$ between the elements, each category being numbered by subscripts from front to rear, are as defined by the following algebraic inequalities:

$$1.58 < N_2 < (N_1+N_3)/2 < 1.82$$
$$25. < V_2 < 0.31(V_1+V_3) < 40.$$
$$2.5/F < -P_2 < 2.86/F$$
$$1.6/F < (P_1+P_3)/2 < 1.8/F$$
$$0.3R_3 < R_4 < R_3$$
$$0.05F < t_3 < t_1 < 0.28F$$
$$0.045F < \tfrac{1}{3}s_2 < s_1 < 0.7s_2 < 0.17F$$

where F is the focal length of the objective.

2. An objective according to claim 1 in which the overall length of the objective is between $0.4F$ and $0.8F$.

3. An objective according to claim 1 in which $(t_1+s_1)$ is between $0.8(s_2+t_3)$ and $1.1(s_2+t_3)$ and $t_1 > 1.2t_3$.

4. An objective according to claim 3 in which $t_1$ is greater than $0.20F$ and the overall length of the objective is between $0.65F$ and $0.8F$.

5. An objective according to claim 1 which is further defined by the following inequalities:

$$0.8(s_2+t_3) < (t_1+s_1) < 1.1(s_2+t_3)$$
$$2t_3 < t_1$$
$$2s_1 < s_2$$
$$0.4F < (t_1+s_1+t_2+s_2+t_3) < 0.8F$$

6. A photographic objective consisting of a biconcave lens element airspaced between two biconvex elements and made substantially according to the following table:

| Lens | N | V | Radii | Thicknesses |
|---|---|---|---|---|
| I | 1.74 | 44 | $R_1=0.6F$ | $t_1=0.25F$ |
|  |  |  | $R_2=3.5F$ | $s_1=0.08F$ |
| II | 1.65 | 30 | $R_3=0.7F$ | $t_2=0.04F$ |
|  |  |  | $R_4=0.4F$ | $s_2=0.14F$ |
| III | 1.70 | 56 | $R_5=1.2F$ | $t_3=0.20F$ |
|  |  |  | $R_6=0.5F$ |  | where the first column numbers the lens elements in order from front to rear, the second and third columns give the corresponding refractive indices N for the D spectral line and the conventional dispersive index V, and the last two columns give the radii R, the thicknesses t of the elements and the spaces s between the elements, each numbered by subscripts from front to rear, and where F is the focal length of the objective.

7. A photographic objective consisting of a biconcave lens element airspaced between two biconvex elements and made substantially according to the following table:

| Lens | N | V | Radii | Thicknesses |
|---|---|---|---|---|
| I | 1.73 | 51 | $R_1=0.4F$ | $t_1=0.14F$ |
|  |  |  | $R_2=4.3F$ | $s_1=0.07F$ |
| II | 1.69 | 31 | $R_3=0.8F$ | $t_2=0.09F$ |
|  |  |  | $R_4=0.35F$ | $s_2=0.18F$ |
| III | 1.73 | 51 | $R_5=1.3F$ | $t_3=0.05F$ |
|  |  |  | $R_6=0.7F$ |  | where the first column numbers the lens elements in order from front to rear, the second and third columns give the corresponding refractive indices N for the D spectral line and the conventional dispersive index V, and the last two columns give the radii R, the thicknesses t of the elements and the spaces s between the elements, each numbered by subscripts from front to rear, and where F is the focal length of the objective.

WALTER LITTEN.
GEORGE H. AKLIN.
FRED E. ALTMAN.

REFERENCES CITED

The following references are of record in the file of this patent:

UNITED STATES PATENTS

| Number | Name | Date |
|---|---|---|
| 2,279,372 | Herzberger | Apr. 14, 1942 |
| 2,298,090 | Warmisham | Oct. 6, 1942 |
| 2,391,114 | Aklin | Dec. 18, 1945 |
| 2,416,033 | Warmisham et al. | Feb. 18, 1947 |

FOREIGN PATENTS

| Number | Country | Date |
|---|---|---|
| 422,246 | Great Britain | Jan. 8, 1935 |